United States Patent
Philipson

(10) Patent No.: US 6,650,314 B2
(45) Date of Patent: Nov. 18, 2003

(54) METHOD AND AN ELECTRONIC APPARATUS FOR POSITIONING A CURSOR ON A DISPLAY

(75) Inventor: Lars Philipson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 14 days.

(21) Appl. No.: 09/934,140

(22) Filed: Aug. 21, 2001

(65) Prior Publication Data

US 2002/0047830 A1 Apr. 25, 2002

(30) Foreign Application Priority Data

Sep. 4, 2000 (SE) ............................................. 0003135

(51) Int. Cl.[7] ................................................. G09G 5/08
(52) U.S. Cl. ....................................... 345/157; 345/856
(58) Field of Search ................................. 345/157–167, 345/856, 857, 156

(56) References Cited

U.S. PATENT DOCUMENTS 5,012,231 A * 4/1991 Felsenstein ................. 345/161
5,570,111 A * 10/1996 Barrett et al. ............... 345/157
5,585,813 A * 12/1996 Howard ......................... 345/8
5,661,502 A    8/1997 Cheng .......................... 345/145
5,764,219 A    6/1998 Rutledge et al. ............. 345/159

FOREIGN PATENT DOCUMENTS

| JP | 08006712 A | 1/1996 |
| WO | WO 99/09516 | 2/1999 |

OTHER PUBLICATIONS

Form PCT/ISA/201 International Search Report for SE 00/01019 as completed May 7, 2001. (4 pgs.).

* cited by examiner

Primary Examiner—Richard Hjerpe
Assistant Examiner—Alexander Eisen
(74) Attorney, Agent, or Firm—Jenkens & Gilchrist, P.C.

(57) ABSTRACT

A cursor (13) is positioned on a display (5) in response to a user input (12) on a pointing device (10). The user input, which represents a desired cursor movement (14) on the display, is converted to time varying magnitude and argument components in polar space. The magnitude component is processed so as to control a speed of movement of the cursor on the display. Separately from this, the argument component is processed so as to suppress rapid angular variations in the movement of the cursor on the display.

18 Claims, 7 Drawing Sheets

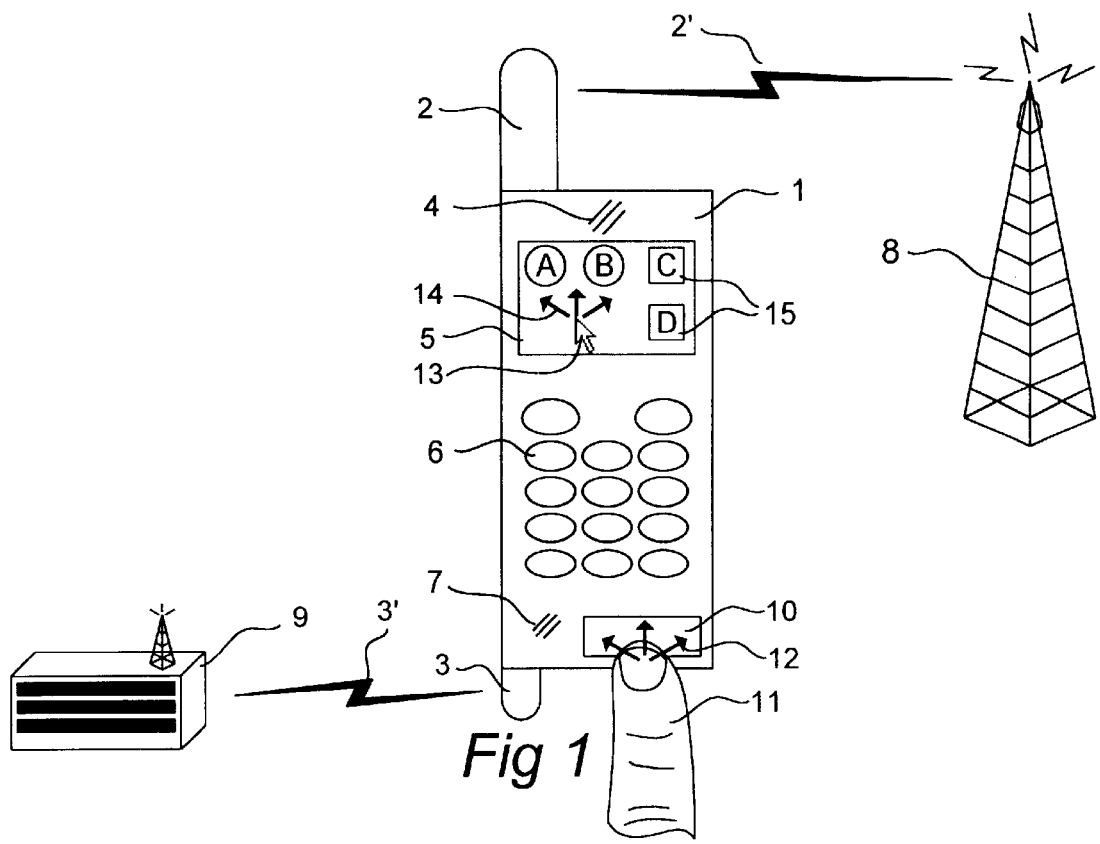
Fig 1
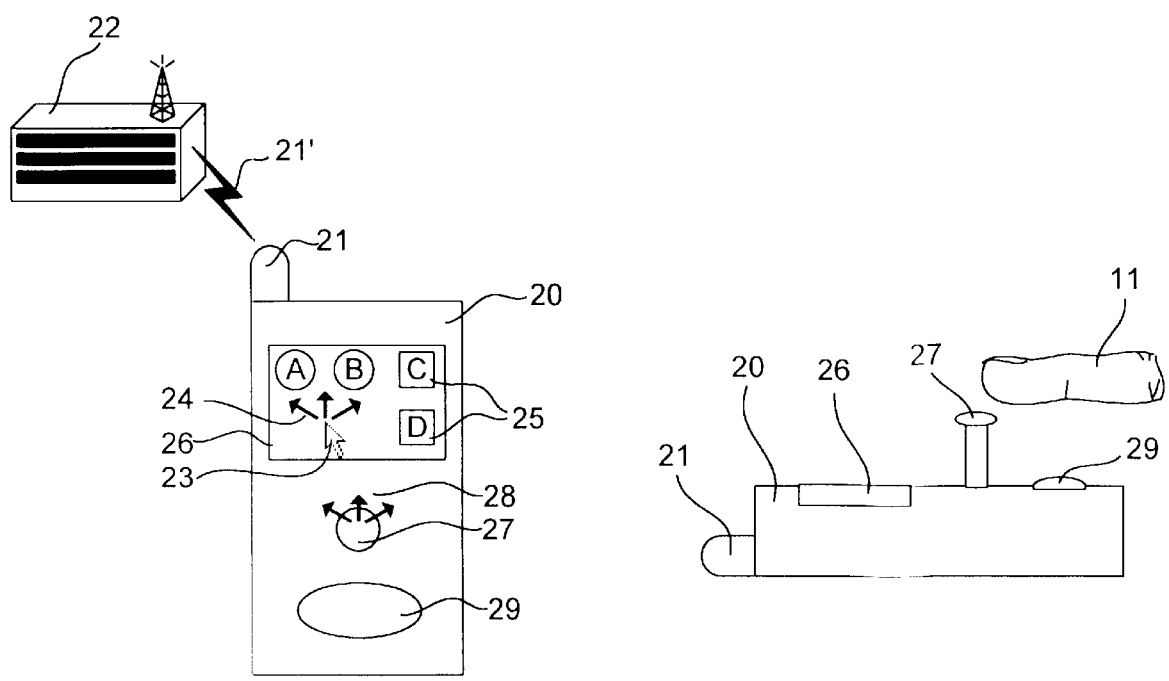
Fig 2
Fig 3

Median filter

Polar conversion

Sigmoidal gain

Argument filter

State machine for argument filter

Low pass filter for conditional directional inertia

METHOD AND AN ELECTRONIC APPARATUS FOR POSITIONING A CURSOR ON A DISPLAY

TECHNICAL FIELD

The present invention relates to a method and an electronic apparatus for positioning a cursor on a display in response to a user input on a pointing device, where the user input represents a desired cursor movement on the display.

PRIOR ART

A wide variety of pointing devices have been proposed and used to implement user control of a cursor on a graphical display screen. The simplest form of pointing device is a set of navigation keys on a keypad, normally implemented as "arrow keys", which represent discrete cursor movements upwards, downwards, to the left and to the right on the screen. The present invention is not particularly related to such discrete pointing devices.

The other main class of pointing devices is continuous (analog) devices, where the user controls the cursor position in a continuous manner by varying a physical input to the pointing device. A first subclass of continuous pointing devices comprises positional (movable) joysticks, mouse controls and trackball controls. Here, the user physically moves the pointing device in two dimensions, and the movement represents a desired cursor movement.

A second subclass includes capacitive touch pads and capacitive, thermal or optical fingerprint detectors, where the user moves his/her finger in relation to a stationary surface so as to command the desired cursor movement on the display. A third subclass involves isometric joysticks, where the user controls the position or speed of the cursor by applying a certain amount of force to the joystick in different directions.

The various pointing devices listed above have a similar operating principle in that they will convert the physical user input to analog signals representing the commanded movement in rectilinear space (rectangular x and y coordinates). Throughout this document, a "pointing device" will refer to any device capable of converting a physical user input to signals representing a desired cursor movement on a display.

Pointing devices are used in many different applications for controlling a cursor on a display of an electronic apparatus. In some applications, e.g. when an ordinary mouse or trackball control is used for controlling a graphical user interface on a personal computer, the user normally has unrestricted space and a solid surface to move the pointing device on. Consequently, the output signals (x and y coordinates) from the pointing device will normally be of good quality with low noise and a high level of consistency.

In other applications, on the other hand, a miniaturized pointing device is used for small-sized portable equipment, such as a hand-held computer, a portable digital assistant, a mobile telephone, a wireless electronic payment device, etc. In these situations, the environment cannot be expected to be as stable and troublefree as in the above case. On the contrary, the output signals from the pointing device are likely to be noisy and contain spurious or rapidly varying information, due to trembling of the user's hand or finger, unexpected external influence, rapid and temporary variations in speed or direction in the user input, etc.

Consequently, particularly for portable and miniaturized equipment, it may be difficult for the user to provide an accurate input on the pointing device, which obviously may affect the accuracy of the cursor navigation undesiredly. Therefore, it is necessary to provide support for effective removal of noise in the output signal from the pointing device and also to provide arrangements which will facilitate positioning of the cursor and provide a resulting smooth and accurate movement on the display.

U.S. Pat. No. 5,661,502 relates to a self-adjusting digital filter for smoothing computer mouse movements. The speed of the mouse movement is calculated from the rectangular x and y coordinates from the mouse. A user-selectable inertial constant is applied to the calculated mouse movement so as to provide corrected mouse position data. Preferably, the inertial constant depends on the speed of the mouse movement. Consequently, the amount of filtering applied will be different for slow mouse movements than for faster movements, and the amount of correction of the mouse track will differ correspondingly.

U.S. Pat. No. 5,764,219 discloses a force-type joystick, where the amount of force applied to the joystick controls the speed of the cursor on the display. In this document it is observed that conventional force to velocity mapping in force-type joysticks involves transfer functions, according to which the cursor velocity always increases as the input force increases. This generally makes a conventional force joystick frustrating to use, since when the joystick is actuated to its maximum extent, the cursor tends to move across the display at a speed, which is faster than the eye can follow. In turn, this often causes the user to overshoot the target point on the display, wherein the user will have to make additional joystick corrections in order to recover from the overshoot.

According to U.S. Pat. No. 5,764,219, the situation is improved by providing a predefined non-linear transfer function between input force and output cursor velocity. More specifically, a parabolic sigmoidal transfer function is used, which includes a cut-off plateau in cursor velocity for high input forces, so that the maximum cursor velocity will be limited to a velocity, which can be comfortably tracked by the human eye on the display.

According to one embodiment (which is disclosed in FIG. 6 and is described in column 5, lines 9–44 of U.S. Pat. No. 5,764,219), the aforesaid non-linear transfer function is applied only to the speed of the cursor movement but not to the direction of the cursor movement. This is obtained by the provision of a converter for converting from rectangular input coordinates (x and y signals) to polar coordinates of magnitude and direction (argument). Then, the non-linear transfer function is applied only to the magnitude coordinate but not to the direction coordinate. It is described that this arrangement will achieve a desired upper limitation of cursor speed, while preserving the direction of the cursor movement, so that the latter will correspond directly to the user input without any filtering thereof.

FIG. 5 of the enclosed drawings contains a schematic block diagram of the aforesaid embodiment of U.S. Pat. No. 5,764,219. Rectangular input coordinates x and y are submitted by the user through a pointing device 80. The input is preprocessed in a filter 82 and is then converted to polar coordinates $\rho$ and $\theta$ in a polar converter 84. The non-linear gain is provided to the magnitude $\rho$ by an amplifier 86, but the direction $\theta$ is not processed. A rectangular converter 88 converts $\rho$ and $\theta$ back to rectilinear space, and the result of the conversion is supplied to a display drives 90 and a display 92.

The present inventor has reached an insight that in some applications, particularly for portable or miniaturized equipment, the direction of the movement commanded through the pointing device is more sensitive to noise than the magnitude or speed of the movement. A high level of noise or a large amount of rapid unintentional directional variations will jeopardize a steady cursor course on the display and will make it difficult to navigate properly between different targets on the display. Presently, it appears that this problem is particularly pronounced for pointing devices of subclasses two and three above, i.e. force-type joysticks, touch pads, fingerprint detectors, etc.

SUMMARY OF THE INVENTION

It is an object of the present invention to provide improved cursor control on a display by means of a pointing device, particularly as regards portable or miniaturized equipment, in a situation where the output signals from the pointing device may be expected to contain a considerable level of noise and unintentional rapid variations.

In particular the present invention seeks to reduce the time required for moving the cursor from a first position to a second position on the display. It also aims at reducing the rate of unsuccessful cursor movements, i.e. when the cursor does not hit the intended target on the screen. Moreover, the invention seeks to improve the perceived control of the cursor, as experienced by the user.

The above objects have been achieved by converting the user input received through the pointing device from rectangular coordinates to polar coordinates of magnitude and argument, and by processing the magnitude coordinate so as to control the speed of movement of the cursor on the display, as well as separately processing the argument coordinate so as to suppress rapid angular variations in the movement of the cursor on the display.

Preferably, the argument coordinate is processed by heavy low pass filtering so as to provide inertia to the directional component of the user input, thereby preventing rapid unintentional variations in direction for the cursor on the display and, thus, establishing a steady and user-friendly cursor course.

Even more preferably, the argument coordinate is subjected to a non-linear filter having the following three operating modes:
- a startup mode where low pass filtering with increasing time constant is applied, so as to provide increasing inertia to the argument component,
- a steady mode where low pass filtering with an invariant long time constant is applied, and
- a reset mode where the inertia is removed and the filter may be reset to its startup mode.

Still more preferably, the processing of the argument coordinate is obtained by a digital low pass filter having a variable filter length and a plurality of filter coefficients, which are chosen so that the degree of low pass filtering applied to the argument coordinate is stronger for a longer filter length than for a shorter filter length, and wherein the filter length is varied in response to whether a certain predetermined condition is reached. This condition may preferably be a reset of the filter length after a certain time period of inactivity (timeout). The degree of low pass filtering may also be varied depending on the value of the magnitude component. A low value of the magnitude component corresponds to a low speed of movement, and in this case the degree of low pass filtering may be small or even zero. On the other hand, a large value of the magnitude component corresponds to a rapid cursor movement, and consequently a higher degree of low pass filtering is applied so as to obtain a steady cursor course on the display.

The above objects are also achieved through a method and an apparatus according to the attached independent claims. Other objects, features and advantages of the present invention will appear from the following detailed disclosure of a preferred embodiment, from the drawings as well as from the dependent claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The present invention will now be described in more detail with reference to the enclosed drawings, in which:

FIG. 1 is a schematic front view of a first example of an electronic apparatus, in which the present invention may be applied, FIG. 2 is a schematic front view of a second example of an electronic apparatus, in which the present invention may be applied, FIG. 3 is a schematic side view of the electronic apparatus shown in FIG. 2.

DETAILED DISCLOSURE

Figure 4:
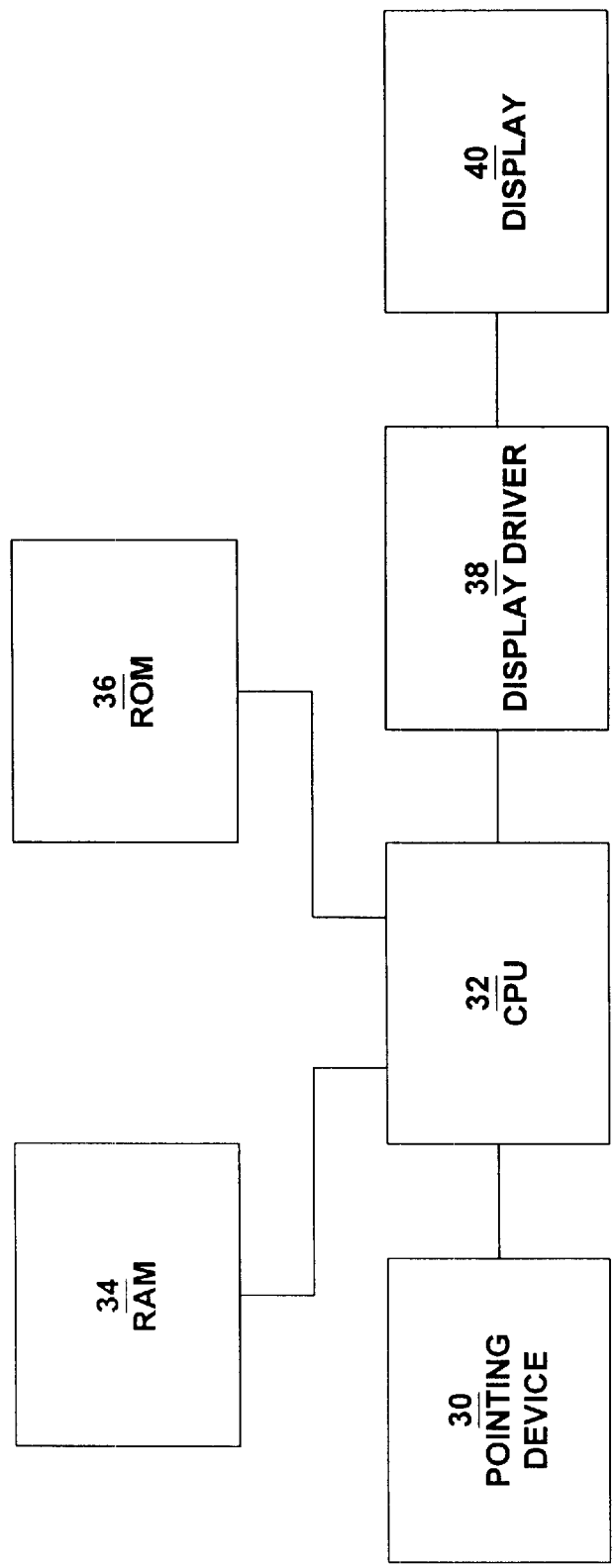
FIG. 4 is a schematic block diagram of the major electronic components of the electronic apparatus according to the invention.
Figure 5:
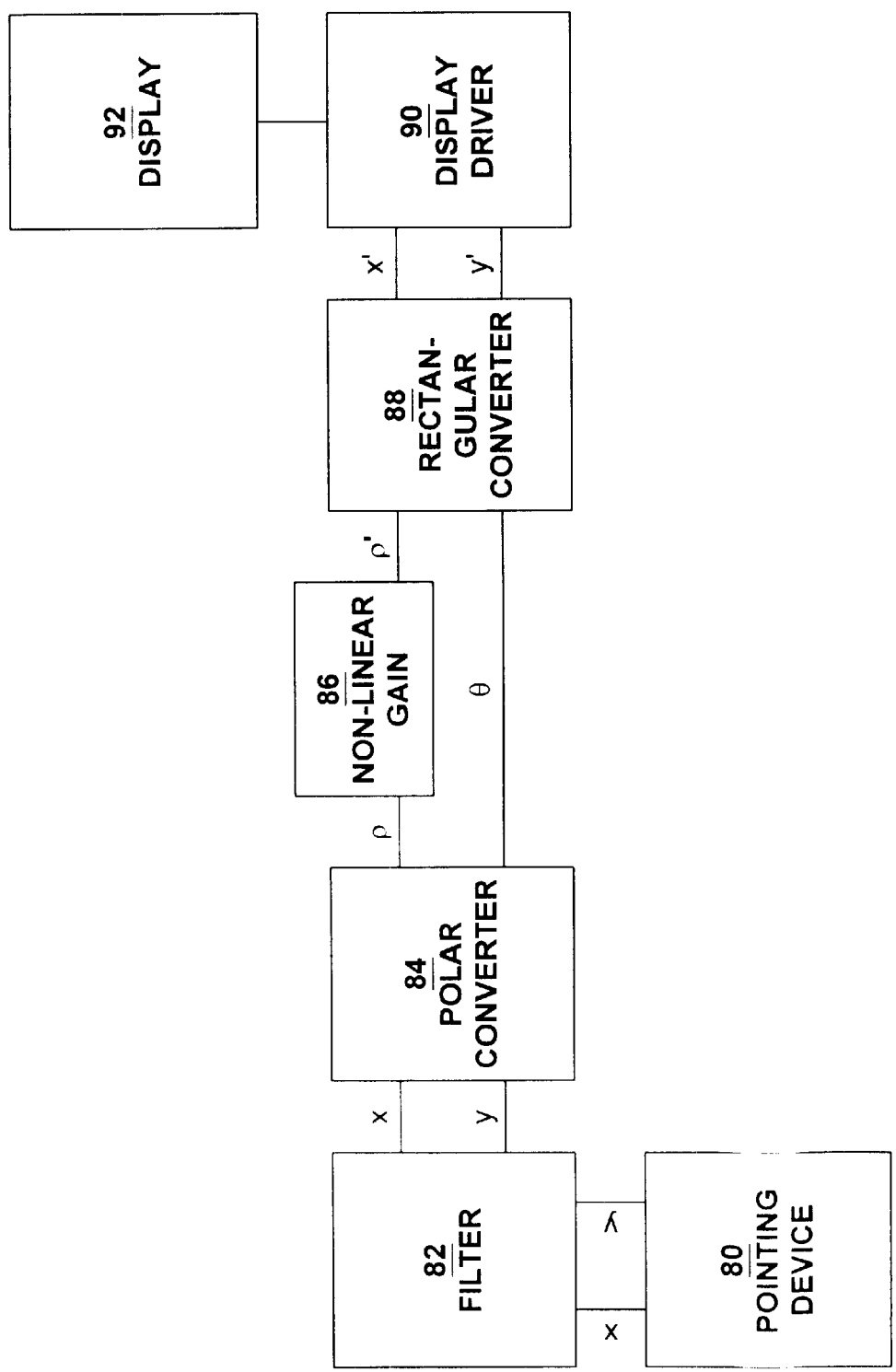
FIG. 5 is a schematic block diagram illustrating a prior art arrangement for positioning a cursor of a display by means of a pointing device.

FIG. 1 illustrates an electronic apparatus in the form of a mobile telephone 1. FIG. 2 shows an electronic apparatus 20 for remote financial transactions, e.g. wireless payment. The mobile telephone 1 of FIG. 1 and the electronic payment device 20 of FIG. 2 are provided as two examples of an electronic apparatus, in which the present invention may be applied.

As shown in FIG. 1, the mobile telephone 1 comprises a first antenna 2, which is adapted to establish and maintain a first radio link 2' to a base station 8 in a mobile telecommunications system, such as GSM ("Global System for Mobile communications"). The mobile telephone 1 also has a second antenna 3, which is used for communicating with a remote device 9 over a second radio link 3'. The second antenna 3 may for instance be adapted for Bluetooth® or another kind of short-range supplementary data communication, e.g. on the 2.4 GHz ISM band ("Industrial, Scientific and Medical"). Bluetooth is a registered trademark in the name of Telefonaktiebolaget L M Ericsson.

As any other contemporary mobile telephone, the telephone 1 comprises a loudspeaker 4, a display 5, a keypad 6 and a microphone 7. In addition to this, the telephone 1 also has a fingerprint detector 10, which may be used by the user of the telephone 1 to navigate a cursor 13 in desired directions 14 on the display 5. By moving his/her finger 11 in desired directions 12 across the fingerprint detector 10, the user may thus navigate the cursor 13 between different targets 15 on the display 5. The targets 15 may comprise conventional objects known from various types of graphical user interfaces, such as buttons, pop-up menus, checkboxes, etc. The display 5 may advantageously be a liquid crystal display (LCD).

A possible implementation of a fingerprint detector 10 is a thermal silicon chip detector called FingerChip™, which is commercially available from Thompson-CSF Semiconducteur Specifique, Route Départementale 128, BP 46, 91 401 ORSAY Cedex, France. This detector uses the heat generated by the finger 11 to produce a greyscale image of a fingerprint. When the finger 11 is moved in a direction 12 across the fingerprint detector 10, the detector will produce a sequence of partially overlapping fingerprint frames at a constant rate. By calculating the correlation between subsequent fingerprint frames, a displacement vector may be established for the displacement between the frames. The resulting output is time-varying x and y signals representing the coordinates of the displacement vector in rectilinear (two-dimensional) space.

In addition to positioning the cursor 13 on the display 5, the user may perform a selecting operation equivalent to a conventional mouse click by pressing a selected one of the keys on the keypad 6, or, alternatively, by tapping the fingerprint detector 10. Within the scope of the invention, also other types of fingerprint detectors are possible, e.g. optical or capacitive detectors.

Referring now to FIG. 2, the electronic payment device 20 disclosed therein has an antenna 21 for establishing a radio link 21' to a remote device 22. The remote device 22 may e.g. be a cashier desk or another type of checkout point in a shop environment. The wireless link 21' may e.g. be a Bluetooth® link equivalent to the link 3' in FIG. 1.

The device 20 comprises a display 26 for providing a graphical user interface with different selectable objects 25. The display 26 as well as the cursor 23 and the objects 25 displayed thereon may be essentially equivalent to items 5, 13 and 15 of FIG. 1. A user may navigate the cursor 23 in desired directions 24 on the display 26 by actuating a joystick 27 in different directions 28. Advantageously, the joystick 27 is isometric (a force-type joystick), wherein the user will apply a certain amount of force by his/her finger or thumb 11 to the joystick 27 in order to command a movement of the cursor 23 at certain speed and in a given direction 24 on the display 26. The isometric joystick 27 provides a time-varying output having x and y components corresponding to the momentary amount of pressure applied in a rectangular plane. Additionally, the isometric joystick 27 may be adapted to provide a third component (z) in its output, representing a position in a direction orthogonal to aforesaid rectangular plane. Hence, by momentarily depressing the isometric joystick 27 with the finger 11 in a direction towards the apparatus housing of the electronic payment device 20, the user may command a selecting operation equivalent to a conventional mouse click. Consequently, in this case the resulting output from the isometric joystick 27 will be time-varying signals having x, y and z components corresponding to the momentary actuation of the joystick 27 in three-dimensional rectilinear space.

Alternatively, a selecting operation may be commanded by depressing a separate button 29 on the electronic payment device 20. In this case, the output from the separate button 29 (corresponding to a momentary displacement of the button in a normal direction to the front surface of the electronic payment device 20) will be combined with the two-dimensional (x, y) output from the isometric joystick 27 to provide a time-varying output having three components (x, y and z) in three-dimensional rectilinear space.

FIG. 4 is a generic representation of any of the electronic apparatuses shown in FIGS. 1–3. As shown in FIG. 4, the apparatus comprises a pointing device 30, which represents the fingerprint detector 10 or the isometric joystick 27 in FIGS. 1–3. Moreover, the pointing device 30 may also represent another type of commercially available pointing device, such as a positional (movable) joystick, a touch pad, etc. Presently, the invention is believed to be particularly well suited for the pointing devices shown in FIGS. 1–3, but the central ideas of the invention may apply to virtually any type of pointing device, including mouse controls and trackball controls. Correspondingly, the central ideas of the invention may be applied to various electronic equipment, including portable digital assistants, hand-held computers, lap-top computers, stationary computers, automatic teller machines and video game machines. Moreover, the invention is applicable also to electronic equipment of the type where a display is remotely controlled from a pointing device through e.g. an infrared link or a Bluetooth® link.

Referring back to FIG. 4, as already mentioned, the pointing device 30 (fingerprint detector 10, isometric joystick 27, etc.) provides a time-varying output having at least two, optionally three, orthogonal components in two-dimensional (or optionally three-dimensional) rectilinear space. The pointing device 30 is connected to a controller 32, which is preferably implemented by any commercially available microprocessor (CPU), or alternatively by another type of programmable logic circuitry.

The controller 32 is connected to a random access memory (RAM) 34 to serve as work memory for the controller 32. The controller 32 is also connected to a read-only memory (ROM) 36, which may be used for storing program instructions to be executed by the controller 32 in order to perform the method according to the present invention.

The controller 32 is also connected to a display driver 38 and a display 40, wherein the latter represents any of the displays 5 or 26 shown in FIGS. 1–3. The controller 32 is adapted to control the information presented on the display 40 through the display driver 38, including the cursor 13, 23 and the display objects 15, 25.

Figure 6:
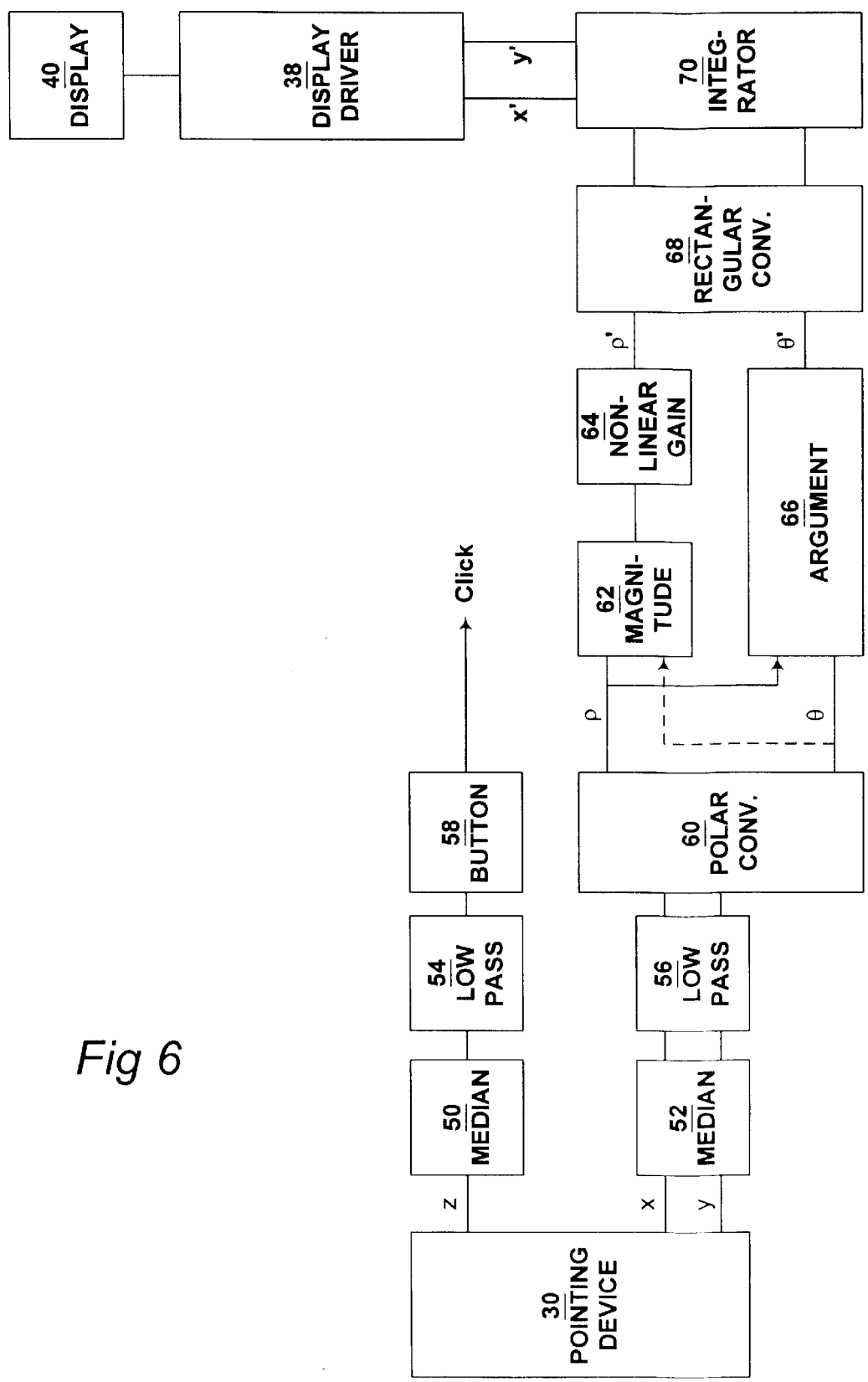
FIG. 6 is a schematic block diagram of an arrangement for performing the method of positioning a cursor on a display according to a preferred embodiment.

FIG. 6 illustrates the electronic apparatus of FIG. 4 in greater detail. In addition to the pointing device 30, the display driver 38 and the display 40 of FIG. 4, FIG. 6 contains a plurality of components 50–70, which in the preferred embodiment are all implemented in software by a plurality of program instructions, which are stored in the memory 36 of FIG. 4 and are executed by the controller 32. However, some or all of these components could equally well be implemented in hardware (in the form of an Application Specific Integrated Circuit, discrete analog and digital components, etc.) or as a combination of hardware and software, as is readily realized by a man skilled in the art.

Aforesaid components 50–70 are provided for performing certain processing of the rectangular x, y and, optionally, z coordinates produced by the pointing device 30 in response to the user input. As already mentioned, the x and y coordinates represent a desired cursor movement on the display 40, as applied through the pointing device 30. Correspondingly, the optional z coordinate represents a selecting operation equivalent to a conventional mouse click on any of the objects presented on the display 40.

Even if the existence of a z coordinate is most useful in many applications, the presence thereof is not essential when it comes to the central idea of the invention. Instead, the invention is directed at an improved processing of the rectangular x and y coordinates for the desired cursor movement from the pointing device 30. Consequently, the components in FIG. 6 which are related to the z coordinate, i.e. components 50, 54 and 58, shall not be regarded as essential to the invention. These components involve a median filter 50 to remove spurious data samples of the z coordinate from the pointing device 30, followed by a low pass filter 54 and a button detector 58, which as an output signal Click will produce a binary value 1 in response to a clicking operation submitted through the fingerprint detector 10, the force joystick 27, the button 29, etc. In situations where no clicking operation is submitted, the output signal Click will be 0.

In the preferred embodiment, the coordinates x and y (and optionally z) are digital signals throughout the process chain formed by components 52 through 70 (optionally 50 through 58). Therefore, if the output from the pointing device 30 is analog, appropriate sampling and A/D conversion must take place prior to the arrival of the signals x, y (and optionally z) to the first component 52 (50).

Figure 8:
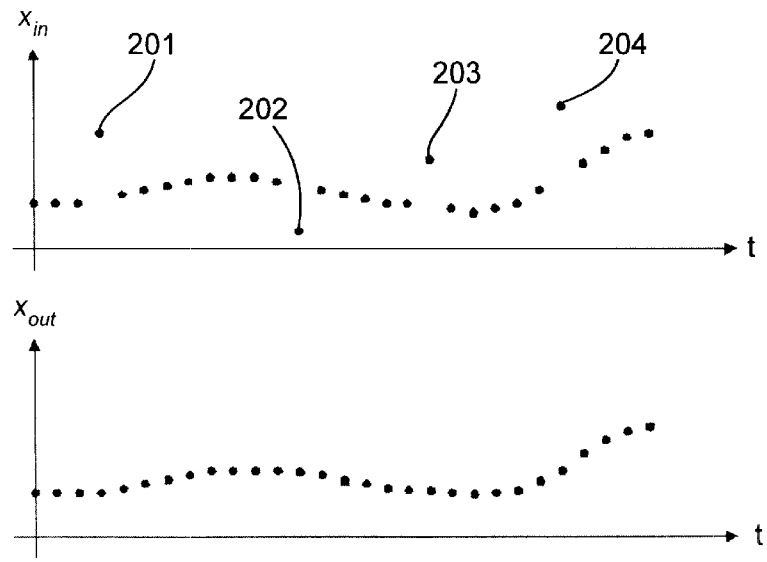
FIG. 8 illustrates the operation of a median filter of FIG. 6.

As seen in FIG. 6, the x and y coordinates from the pointing device 30 are initially fed to a median filter 52 in order to remove extreme values and noise from the input. In the preferred embodiment the last five samples for each input variable x, y are stored. The lowest and highest values among these are excluded and replaced by a mean value of the remaining three samples. The oldest of the samples is output from the median filter 52. The operation of the median filter is schematically illustrated in FIG. 8 for the x coordinate. FIG. 8 is, however, equally applicable also to the y coordinate. As shown in FIG. 8, extreme data samples 201, 202, 203 and 204 are removed from the input coordinate $x_{in}$ before the output $x_{out}$ is supplied from the median filter.

Following the median filter 52 a low pass filter 56 is applied to the x and y coordinates in order to remove high frequencies. Preferably, the low pass filter is implemented by explicit convolution in the form of a digital filter having a plurality of filter coefficients. By tuning the filter coefficients, the desired cut-off frequency may be appropriately selected for the filter, as is readily realized by a man skilled in the art.

Figure 9:
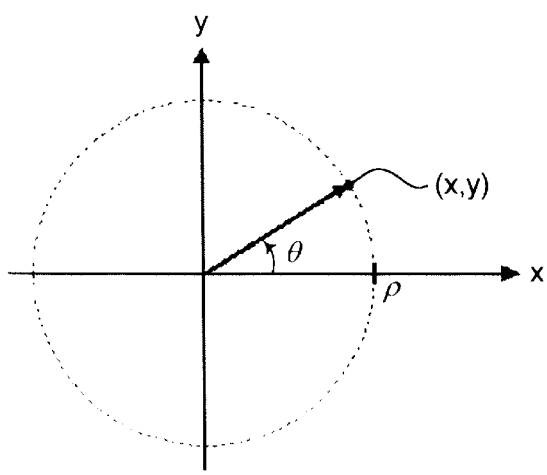
FIG. 9 illustrates the operation of a polar converter of FIG. 6.

The output from the low pass filter 56 is converted to polar coordinates ρ and θ in a polar converter 60 (see also FIG. 9). As previously described, the output x and y coordinates from the pointing device 30 can be viewed as a displacement vector in two-dimensional rectilinear space, wherein the displacement vector represents the momentary actuation by the user on the pointing device 30 so as to command the desired cursor movement on the display 40. The result of the polar conversion is a magnitude coordinate ρ representing the length of the displacement vector, and an argument coordinate θ representing the angle of the displacement vector (i.e. the direction of movement). For an isometric joystick, the magnitude ρ of the displacement vector is conveniently directly mapped to the speed of the cursor movement. For a positional joystick or a fingerprint detector, the magnitude of the displacement vector will normally represent the distance of the cursor movement. In the latter case, the speed of the cursor movement may be obtained by deriving the magnitude of the displacement vector with respect to time. Within the context of the invention, the magnitude coordinate ρ shown in the drawings can represent either cursor movement speed (preferred) or cursor movement distance. For the rest of the disclosure of the preferred embodiment, ρ will represent the speed of the cursor movement.

A central idea behind the invention is that the magnitude and argument coordinates ρ and θ require separate processing in order to obtain an accurate cursor navigation. Starting with the magnitude coordinate ρ, a magnitude filter 62 is applied to this coordinate. The magnitude filter 62 is a mild low pass filter. Preferably, the time constant of the magnitude filter 62 is longer than the time constant used in the initial low pass filter 56 but shorter than for the argument filter 66 described below. The purpose of the magnitude filter 62 is to remove minor fluctuations in the ρ coordinate, due to trembling of the finger 11.

The magnitude filter 62 is followed by a non-linear amplifier 64, which is adapted to add a non-linear gain to the magnitude component ρ. In the preferred embodiment, a sigmoidal transfer function f is applied to the input magnitude component ρ to produce an output ρ' according to:

$$\rho' = f(\rho) = 1/(1 + \exp[\{\rho + \alpha\}/\beta]).$$

Figure 10:
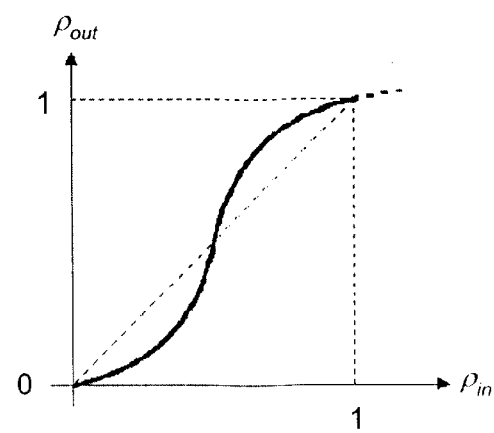
FIG. 10 illustrates the operation of a non-linear amplifier of FIG. 6, FIGS. 11 and 12 illustrate an argument filter indicated in FIG. 6.

As seen in FIG. 10, this transfer function has an s-shaped form, which will act as a speed regulator. For low pressures on the force joystick 27 the cursor movement speed will be low. With increasing pressure the movement will accelerate (at the lower bend of the s curve in FIG. 10). Before reaching its maximum value, the movement will decelerate (upper bend). When slowing down, the low final speed can be effectively fine-tuned. For a detailed explanation of the operation of a sigmoidal transfer function for a pointing device, reference is made to aforesaid U.S. Pat. No. 5,764, 219, which is fully incorporated herein by reference.

Referring now to the argument component θ, separate processing of this coordinate is performed in the argument filter 66. The argument filter is illustrated in more detail in FIGS. 11–13 and will be described further below. The purpose of the argument filter 66 is to modify the angle of the displacement vector, i.e. the θ coordinate, so that rapid angular variations in the user input are suppressed in order to maintain a stable cursor course on the display.

Figure 11:
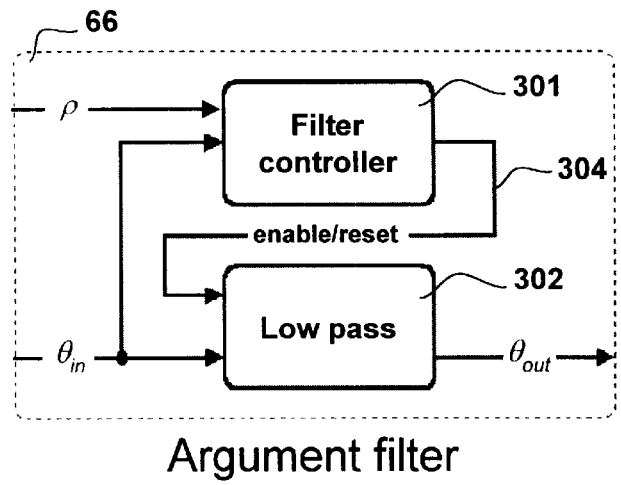

As shown in FIG. 11, the argument filter 66 comprises a filter controller 301 and a low pass filter 302 having a variable time constant. The overall operating principle of the argument filter 66 is as follows. If the magnitude ρ of the displacement vector is small (or zero), the argument θ is not modified; $\theta_{out} = \theta_{in}$. On the other hand, when the magnitude ρ is larger than a predetermined threshold value, the low pass filter 302 is enabled ($\theta_{out} = \theta_{filter}$) in order to add inertia and stabilize the cursor movement. Consequently, the argument filter 66 provides conditional inertia to the argument component θ of the user input.

Figure 12:
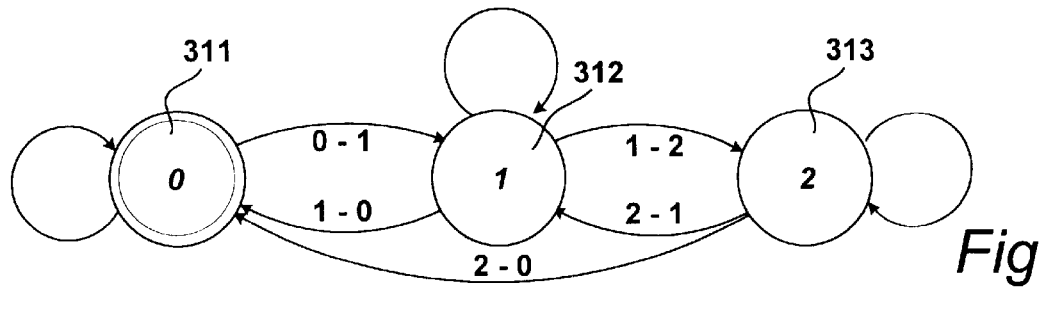

As shown in FIG. 12, the argument filter of the preferred embodiment has three states 311–313, denoted 0, 1 and 2 in FIG. 12. The filter controller 301 controls the operation of the low pass filter 302 through a control signal 304. The operation of the state machine in FIG. 12 is as follows.

| State | Description | Action |
|---|---|---|
| 0 | Low pass filter in inactive mode | No filtering of θ |
| 1 | Low pass filter in startup mode | Increasing filter time constant gives increasing inertia to θ |
| 2 | Low pass filter in steady mode | Invariant long filter time constant gives steady inertia to θ |

| Transition | Condition | Action |
|---|---|---|
| 0–1 | ρ > threshold value | Cursor movement triggers startup mode |
| 1–2 | Maximum filter time constant reached | Enter steady mode |
| 2–1 | Δθ > threshold value | User has changed direction. Reset filter time constant and go back to startup mode |
| 1–0 2–0 | Timeout | No cursor activity for certain time. Go back to inactive mode. |

Figure 13:
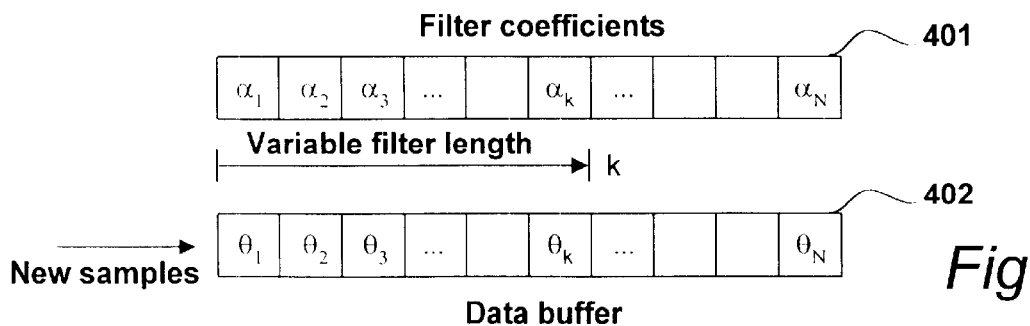
FIG. 13 illustrates the argument filter of FIGS. 11 and 12 in more detail.

The low pass filter 302 of the preferred embodiment is illustrated in more detail in FIG. 13. The filter has a plurality of filter coefficients 401 labeled $\alpha_1$–$\alpha_N$. It also has a data buffer 402 with a plurality of cells for storing samples $\theta_1$–$\theta_N$ of the argument coordinate. The variable filter time constant is implemented by a variable filter length k, so that only filter coefficients $\alpha_1$–$\alpha_k$ will be applied to data samples $\theta_1$–$\theta_k$ at any given time. After the filter has entered the startup mode according to the above, i.e. when transition 0-1 has occurred from state 0 to state 1 in FIG. 12, k will start at 1 and will be incremented each clock cycle, until k=N. In this way, an increasing number of the filter coefficients $\alpha_1$–$\alpha_N$ will be applied to an increasing number of argument coordinate samples $\theta_1$–$\theta_N$ in the data buffer 402. The filter coefficients 401 are chosen so that more inertia (longer time constant, lower cut-off frequency) is provided to the argument coordinate θ as k increases. In effect, this will mean that the output $\theta_{filter}$ from the argument filter 66 will increasingly resist angular variations in the user input, thereby forcing the cursor to keep a steadier course.

When k has reached N, the filter length of the low pass filter 302, and therefore the time constant/cut-off frequency thereof, will be kept constant. This steady state (labeled 2 in FIG. 12) provides invariant inertial to θ, until the user changes cursor direction. When this happens, the change in argument Δθ will exceed a predetermined threshold value, and the transition 2-1 will occur in FIG. 12 from the steady state 2 to the startup state 1, wherein k will be reset to 1.

If there is no cursor activity for a certain time, the filter controller 301 will inactivate the low pass filter 302, i.e. enter the inactive state 0.

In the preferred embodiment, N may be of the order of 100, and the individual filter coefficients $\alpha_1, \alpha_2 \ldots \alpha_N$ will all have a value between 0 and 1, wherein the coefficients with the highest values will be to the right in FIG. 13 (i.e. for filter coefficients $\alpha_u$, where u is close to N), whereas the lowest values of the filter coefficients will be found to the left in FIG. 13 (i.e. for filter coefficients $\alpha_v$, where v is close to 1). Advantageously, the filter coefficients are selected from a graph, which starts at 0, increases rapidly in the beginning and ultimately approaches 1 asymptotically.

The time constant of the low pass filter 302 will vary with increasing filter length k from 0 to about 100–1000 ms, preferably about 300–500 ms, in the preferred embodiment.

Moreover, timeout will preferably occur after about 100 ms. It is to be understood, however, that all values as regards the argument filter 66, including the maximum filter length N, the values of the individual filter coefficients $\alpha_1 \ldots a_N$, the resulting maximum time constant, etc., will have to be selected and tuned depending on an actual application, which is believed to be well within reach of a skilled person. Particularly as regards the filter coefficients $\alpha_1, \alpha_2 \ldots \alpha_N$, the commercially available Signal Processing Toolbox package in the mathematical software product MATLAB (available from the MathWorks Inc., 3 Apple Hill Drive, Natick, Mass. 01760-2098, UNITED STATES) may conveniently be used as a design tool.

As regards the filter length k of the argument filter 66, it may alternatively be reset after an external user event, such as a change in the optional z component/click signal following a selecting operation. Moreover, k may be reduced stepwise instead of being directly reset to 1 in other alternative embodiments.

After having been separately processed in the magnitude filter 62 and the non-linear amplifier 64, and in the argument filter 66, respectively, the resulting coordinates ρ' and θ' are converted back to rectangular coordinates x' and y' by a rectangular converter 68 and an integrator 70.

The resulting rectangular coordinates x' and y' are then supplied to the display driver 38, which will cause the position of the cursor 13, 23 to be updated accordingly on the display 5, 26, 40.

Figure 7:
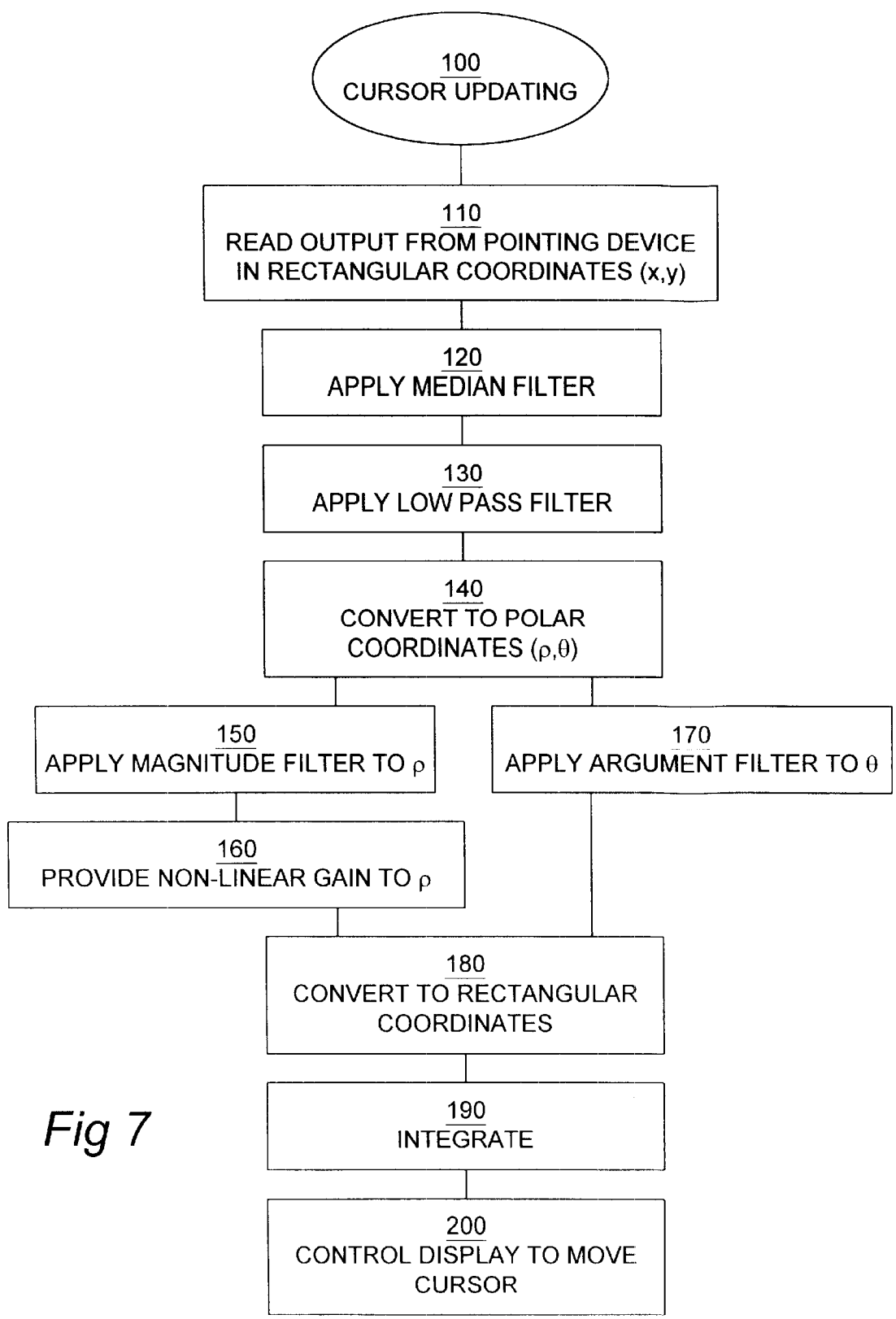
FIG. 7 is a flowchart illustrating the method mentioned for FIG. 6.

A summary of the method performed in order to execute the steps described above is illustrated in a flowchart diagram in FIG. 7.

Even if the preferred embodiment described above operates on digital representations of the coordinates x, y and ρ, θ, the invention may equally well operate in the analog domain and, consequently, use analog components for the argument filter 66, the magnitude filter 62 and the non-linear amplifier 64.

The present invention has been described above with reference to a presently preferred exemplary embodiment. However, other embodiments than the one referred to above are equally possible within the scope of invention, which is best defined by the appended independent claims.

What is claimed is:

1. A method of positioning a cursor on a display in response to a user input on a pointing device, the user input representing a desired cursor movement on the display, wherein the user input is converted to time varying magnitude and argument components in polar space, and wherein the magnitude component is processed so as to control a speed of movement of the cursor on the display, the method comprising the step of processing the argument component, separately from the processing of the magnitude component, so as to suppress rapid angular variations in the movement of the cursor on the display.

2. The method as in claim 1, wherein the argument component is processed by applying a non-linear filter, the non-linear filter having:

a startup mode where low pass filtering with increasing time constant is applied, thereby providing increasing inertia to the argument component, and a steadymode where low pass filtering with an invariant long time constant is applied, wherein the non-linear filter can be reset so as to remove inertia and allow a new startup mode to follow.

3. The method as in claim 1 or 2, wherein the low pass filtering of the argument component is obtained by providing a digital low pass filter having a variable filter length and a plurality of filter coefficients chosen so that the degree of low pass filtering applied to the argument component is stronger for a longer filter length than for a shorter filter length, and wherein the filter length is varied in response to at least one of the following predetermined conditions:

a lapse of time since a defined start moment, a variation in the argument component, a variation in the magnitude component, a user action applied through the pointing device other than the user input.

4. The method as in claim 3, wherein the defined start moment is a beginning of a period of inactivity in the user input.

5. The method as in claim 3, wherein the filter length of the digital low pass filter is a) initially set to a first value, b) repeatedly incremented until a second value is reached, unless step c) is executed prematurely, and c) reset to the first value after aforesaid lapse of time.

6. The method as in any of claims 1–2, wherein the digital low pass filter is applied to the argument component only once the magnitude component has exceeded a predetermined threshold value.

7. An electronic apparatus comprising a display, a user-controlled pointing device, a controller adapted to control a position of a cursor on the display in response to a user input on the pointing device, and a polar converter adapted to convert the user input to time varying magnitude and argument components in polar space, the apparatus comprising:

an argument filter, the argument filter being adapted to process the argument component so as to suppress rapid angular variations in the positioning of the cursor on the display.

8. The apparatus as in claim 7, wherein the argument filter has:

a startup mode where the argument filter acts as a low pass filter with increasing time constant, thereby providing increasing inertia to the argument component, and a steady mode where the argument filter acts as a low pass filter with an invariant long time constant, wherein the argument filter can be reset so as to remove inertia and allow a new startup mode.

9. The apparatus as in claim 7 or 8, further comprising a filter controller capable of activating and deactivating, respectively, the argument filter depending on whether or not the magnitude component exceeds a predetermined threshold value.

10. The apparatus as in claim 7 or 8, wherein the argument filter comprises a digital low pass filter having a variable filter length and a plurality of filter coefficients chosen so that the degree of low pass filtering applied to the argument component is stronger for a longer filter length than for a shorter filter length, and wherein the filter length is varied in response to at least one of the following predetermined conditions:

a lapse of time since a defined start moment, a variation in the argument component, a variation in the magnitude component, a user action applied through the pointing device, other than the user input.

11. The apparatus as in claim 7 or 8, further comprising a computer-readable medium and a set of program instructions stored in the medium and may be executed by the controller, wherein the argument filter is implemented by the program instructions when executed by the controller.

12. The apparatus as in any of claims 7–8, wherein the argument filter is an analog filter.

13. The apparatus as in any of claims 7–8, wherein the pointing device comprises a joystick.

14. The apparatus as in claim 13, wherein the joystick is isometric.

15. The apparatus as in any of claims 7–8, wherein the pointing device comprises a fingerprint detector.

16. The apparatus as in any of claims 7–8, further comprising a radio transceiver for wireless communication.

17. The apparatus as in claim 16 in the form of a mobile telephone.

18. The apparatus as in claim 16 in the form of an electronic payment device.

* * * * *

UNITED STATES PATENT AND TRADEMARK OFFICE
CERTIFICATE OF CORRECTION

PATENT NO. : 6,650,314 B2  
DATED : November 18, 2003  
INVENTOR(S) : Lars Philipson Page 1 of 1

It is certified that error appears in the above-identified patent and that said Letters Patent is hereby corrected as shown below:

Column 2,  
Line 64, replace "drives 90" with -- driver 90 --

Column 4,  
Line 30, replace "of a display" with -- on a display --

Column 9,  
Line 47, replace "inertial to" with -- inertia to --

Column 10,  
Line 4, replace " $\alpha_1...a_N$, with -- $\alpha_1 ... \alpha_N$ --  
Line 61, replace "a steadymode" with -- a steady mode --

Signed and Sealed this

Third Day of August, 2004

JON W. DUDAS  
*Acting Director of the United States Patent and Trademark Office*